US010549193B2

(12) United States Patent
Kitamura

(10) Patent No.: US 10,549,193 B2
(45) Date of Patent: Feb. 4, 2020

(54) GAME SYSTEM, METHOD OF CONTROLLING GAME SYSTEM, AND NONVOLATILE RECORDING MEDIUM

(71) Applicant: CAPCOM CO., LTD., Osaka (JP)

(72) Inventor: Kazuki Kitamura, Osaka (JP)

(73) Assignee: CAPCOM CO., LTD, Osaka (JP)

( * ) Notice: Subject to any disclaimer, the term of this patent is extended or adjusted under 35 U.S.C. 154(b) by 41 days.

(21) Appl. No.: 15/760,021

(22) PCT Filed: Sep. 12, 2016

(86) PCT No.: PCT/JP2016/004128
§ 371 (c)(1),
(2) Date: Mar. 14, 2018

(87) PCT Pub. No.: WO2017/047062
PCT Pub. Date: Mar. 23, 2017

(65) Prior Publication Data
US 2018/0264362 A1 Sep. 20, 2018

(30) Foreign Application Priority Data

Sep. 15, 2015 (JP) ................................. 2015-181953
Jun. 17, 2016 (JP) ................................. 2016-120434

(51) Int. Cl.
A63F 13/52 (2014.01)
A63F 13/5255 (2014.01)
(Continued)

(52) U.S. Cl.
CPC .......... A63F 13/5255 (2014.09); A63F 13/42 (2014.09); A63F 13/54 (2014.09); A63F 13/837 (2014.09)

(58) Field of Classification Search
CPC ........ A63F 13/525; A63F 13/10; A63F 13/12; A63F 13/20; A63F 13/213; A63F 13/49; A63F 13/52; A63F 13/5252; A63F 13/53
See application file for complete search history.

(56) References Cited

U.S. PATENT DOCUMENTS

2014/0364228 A1* 12/2014 Rimon .................... A63F 13/12
463/32

FOREIGN PATENT DOCUMENTS

JP 2008-93307 A 4/2008
JP 2009-130854 A 6/2009
(Continued)

OTHER PUBLICATIONS

International Search Report issued for corresponding PCT/JP2016/004128 application.

Primary Examiner — Omkar A Deodhar
(74) Attorney, Agent, or Firm — IP Business Solutions, LLC

(57) ABSTRACT

A game system includes: a virtual camera control unit configured to control a virtual camera configured to take an image of a three-dimensional virtual game space; a game image generating unit configured to generate a game image based on the taken image; a sound reproducing unit configured to reproduce sound data in accordance with a situation of a game; and a first operation acquiring unit configured to acquire a physical and continuous displacement amount of a first operating portion operated by a user. In accordance with a continuous change in the displacement amount of the first operating portion, the virtual camera control unit continuously changes a zoom ratio of the virtual camera, and the sound reproducing unit continuously changes a method of reproducing the sound data.

15 Claims, 8 Drawing Sheets

(51) Int. Cl.
*A63F 13/54* (2014.01)
*A63F 13/42* (2014.01)
*A63F 13/837* (2014.01)

(56) References Cited

FOREIGN PATENT DOCUMENTS

JP  2012-239761 A  12/2012
JP  2015-196041 A  11/2015

\* cited by examiner

GAME SYSTEM, METHOD OF CONTROLLING GAME SYSTEM, AND NONVOLATILE RECORDING MEDIUM

TECHNICAL FIELD

The present invention relates to a game system of a game using a three-dimensional virtual game space as a stage, a method of controlling the game system, and a nonvolatile recording medium.

BACKGROUND ART

Conventionally, there are games that progress in such a manner that a player character acts in a virtual game space by operations of a user. One example of such games is a gun shooting game that progresses in such a manner that: a user operates a player character who possesses a firearm such as a gun or a rifle; and the player character shoots and beats an encountered enemy character (see PTL 1, for example).

PTL 1 discloses a technology of zooming in a shooting target and displaying an enlarged image of the target on a display connected to a game system. Specifically, when a gun-shaped controller operated by a user is directed to a screen connected to a game machine, an aiming position on the screen by the gun-shaped controller is detected. Then, it is determined whether or not the aiming position is located within a predetermined range from a point preset at an object existing in the virtual game space. As a result, when it is determined that the aiming position is located within the predetermined range, zooming-in is performed, and the aiming position and its vicinity are enlarged and displayed.

CITATION LIST

Patent Literature

PTL 1: Japanese Laid-Open Patent Application Publication No. 2008-93307

SUMMARY OF INVENTION

Technical Problem

However, according to the game of PTL 1, a zoom ratio is fixed, and an image cannot be enlarged at the zoom ratio desired by the user. In action games such as a gun shooting game, it is necessary in some cases to quickly recognize the existence of the enemy character and accurately shoot a distant target. Therefore, it is desirable for the user that: an image can be enlarged and displayed at a desired arbitrary zoom ratio in accordance with a situation of a game; and an operation for enlarging and displaying the image can be quickly performed.

Typically, the zoom ratio of a virtual camera is increased when the user gazes the distant target. In this case, as the zoom ratio increases, concentration of the user naturally increases. Therefore, it is preferable to perform presentation that further increases the concentration of the user as the zoom ratio of the virtual camera increases.

An object of the present invention is to provide a game system that realizes a game in which: a zoom ratio of a virtual camera configured to take an image of a virtual game space can be intuitively and quickly adjusted to a zoom ratio desired by a user; and presentation that promotes a change in concentration of the user in accordance with a change in the zoom ratio can be performed, a method of controlling the game system, and a nonvolatile recording medium.

Solution to Problem

A game system according to the present invention includes: a virtual camera control unit configured to control a virtual camera configured to take an image of a three-dimensional virtual game space; a game image generating unit configured to generate a game image based on the taken image; a sound reproducing unit configured to reproduce sound data in accordance with a situation of a game; and a first operation acquiring unit configured to acquire a physical and continuous displacement amount of a first operating portion operated by a user, wherein in accordance with a continuous change in the displacement amount of the first operating portion, the virtual camera control unit continuously changes a zoom ratio of the virtual camera, and the sound reproducing unit continuously changes a method of reproducing the sound data.

Advantageous Effects of Invention

The present invention can provide a game system that realizes a game in which: a zoom ratio of a virtual camera can be intuitively and quickly adjusted to a zoom ratio desired by a user; and presentation that promotes a change in concentration of the user in accordance with a change in the zoom ratio can be performed, a method of controlling the game system, and a nonvolatile recording medium.

DESCRIPTION OF EMBODIMENTS

Figure 1:
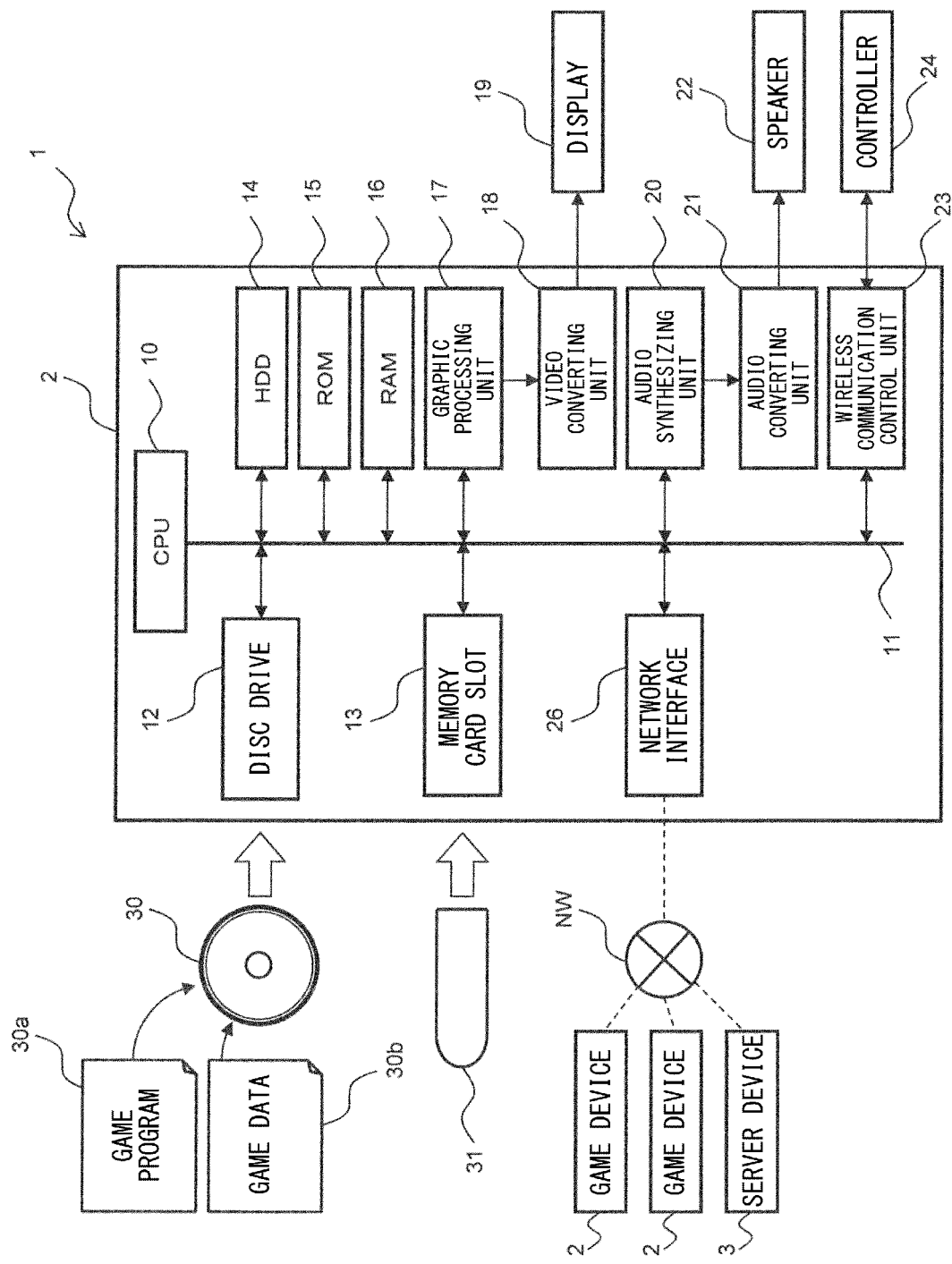
FIG. 1 is a block diagram showing a hardware configuration of a game system.

A game system according to the present invention includes: a virtual camera control unit configured to control a virtual camera configured to taken an image of a three-dimensional virtual game space; a game image generating unit configured to generate a game image based on the taken image; a sound reproducing unit configured to reproduce sound data in accordance with a situation of a game; and a first operation acquiring unit configured to acquire a physical and continuous displacement amount of a first operating portion operated by a user, wherein in accordance with a continuous change in the displacement amount of the first operating portion, the virtual camera control unit continuously changes a zoom ratio of the virtual camera, and the sound reproducing unit continuously changes a method of reproducing the sound data.

According to this, the user can displace the first operating portion to intuitively, continuously, and quickly adjust the zoom ratio of the virtual camera to a desired zoom ratio. Further, in accordance with the change in the zoom ratio, the method of reproducing the sound data can be continuously changed, and this can promote the change in the concentration of the user. Therefore, it is possible to provide a game that: can perform presentation which increases or eases the concentration of the user; gives variations to a game progress; and hardly bores the user.

As the displacement amount of the first operating portion increases, the virtual camera control unit may increase the zoom ratio of the virtual camera, and the sound reproducing unit may lower a pitch of reproduced sound of the sound data.

According to this, when the zoom ratio of the virtual camera increases, the pitch of the BGM or the like listened by the user is lowered. Therefore, the concentration of the user easily increases.

The sound reproducing unit may attenuate a waveform of a predetermined high-pitched sound range contained in the sound data to lower the pitch of the reproduced sound of the sound data.

According to this, while using the same sound data, the pitch of the reproduced sound can be lowered in accordance with the change in the zoom ratio. To be specific, as the sound data reproduced in accordance with the change in the zoom ratio, it is unnecessary to prepare plural pieces of data in advance. Therefore, an increase in size of game data can be suppressed. It should be noted that to attenuate the waveform of the high-pitched sound range, a low pass filter may be used.

As the displacement amount of the first operating portion increases, the virtual camera control unit may increase the zoom ratio of the virtual camera, and the sound reproducing unit may increase a volume of reproduced sound of the sound data generated at a region taken by the virtual camera in the virtual game space.

According to this, when the zoom ratio of the virtual camera increases, the volume of the effect sound (i.e., sound effect (SE)) in a region taken by the virtual camera, the volume of voices of other characters in the region, and the like increases. As a result, the concentration of the user easily increases, and realistic sensation also increases.

The sound reproducing unit may start reproducing predetermined sound data with a generation of a predetermined event in the virtual game space as a trigger, and until a predetermined time elapses since the start of the reproduction of the predetermined sound data, the sound reproducing unit may inhibit a change of the method of reproducing the sound data regardless of the displacement amount of the first operating portion.

According to this, an introduction part of a musical piece can be reproduced in an original state, and the presentation at the time of the generation of the event can be effectively performed. It should be noted that a specific example of the "change of the method of reproducing the sound data" which is inhibited is the "lowering of the pitch of the reproduced sound." Further, the computer may further serve as a character control unit configured to control actions of a player character in the virtual game space, and the predetermined event may be an event related to a predetermined action performed by the player character. Or, the sound reproducing unit may start reproducing the predetermined sound data with the generation of the predetermined event in the virtual game space as a trigger, and until the predetermined time elapses since the start of the reproduction of the predetermined sound data, the sound reproducing unit may inhibit an increase in the volume of the reproduced sound of the sound data generated at a region taken by the virtual camera regardless of the operation amount of the first operating portion.

A method of controlling a game system according to the present invention includes: a virtual camera controlling step of controlling a virtual camera configured to take an image of a three-dimensional virtual game space; a game image generating step of generating a game image based on the taken image; a sound reproducing step of reproducing sound data in accordance with a situation of a game; and a first operation acquiring step of acquiring a physical and continuous displacement amount of a first operating portion operated by a user, wherein in accordance with a continuous change in the displacement amount of the first operating portion, the virtual camera controlling step continuously changes a zoom ratio of the virtual camera, and the sound reproducing step continuously changes a method of reproducing the sound data.

A nonvolatile recording medium according to the present invention is a nonvolatile recording medium storing a command executable by a computer, the nonvolatile recording medium being readable by the computer, the command including: a virtual camera controlling step of controlling a virtual camera configured to take an image of a three-dimensional virtual game space; a game image generating step of generating a game image based on the taken image; a sound reproducing step of reproducing sound data in accordance with a situation of a game; and a first operation acquiring step of acquiring a physical and continuous displacement amount of a first operating portion operated by a user, wherein in accordance with a continuous change in the displacement amount of the first operating portion, the virtual camera controlling step continuously changes a zoom ratio of the virtual camera, and the sound reproducing step continuously changes a method of reproducing the sound data.

Hereinafter, a game system, a method of controlling the game system, and a nonvolatile recording medium according to an embodiment of the present invention will be explained in reference to the drawings. The present embodiment will explain, as one example, a gun shooting game in which: a user operates actions of a player character in a virtual game space; and the player character moves to a destination while shooting enemy characters.

Hardware Configuration

FIG. 1 is a block diagram showing a hardware configuration of a game system 1. The game system 1 includes a game device 2 and a server device 3. The game device 2 is communicable with other game devices 2 and the server device 3 through a communication network NW such as the Internet or a LAN. The game device 2 includes a computer processing unit (CPU) 10 that is a computer configured to control operations of the game device 2. A disc drive 12, a memory card slot 13, a hard disc drive (HDD) 14, a read only memory (ROM) 15, and a random access memory (RAM) 16 are connected to the CPU 10 through a bus 11. The HDD 14, the ROM 15, and the RAM 16 constitute a program storage unit.

A disc-shaped recording medium 30 such as a digital versatile disc-ROM (DVD-ROM) can be loaded on the disc drive 12. The disc-shaped recording medium 30 is one example of the nonvolatile recording medium according to the present invention. A game program 30a and game data 30b according to the present embodiment are recorded in the disc-shaped recording medium 30. The game data 30b contains various data, such as data necessary for forming characters and a virtual game space and sound data reproduced in the game, necessary for the progress of the game. A card-shaped recording medium 31 can be loaded on the memory card slot 13. Save data indicating a play situation such as an interim progress of the game can be recorded in the card-shaped recording medium 31 in accordance with an instruction from the CPU 10.

The HDD 14 is a large capacity recording medium incorporated in the game device 2 and records the game program 30*a* and the game data 30*b* read from the disc-shaped recording medium 30 and further records the save data and the like. The ROM 15 is a semiconductor memory, such as a mask ROM or a PROM, and records a start-up program of starting up the game device 2, a program of controlling operations when the disc-shaped recording medium 30 is loaded, and the like. The RAM 16 is constituted by a dynamic RAM (DRAM), a static RAM (SRAM), or the like and reads the game program 30*a* to be executed by the CPU 10, the game data 30*b* necessary when executing the game program 30*a,* and the like from the disc-shaped recording medium 30 or the HDD 14 in accordance with the play situation of the game to temporarily record the game program 30*a,* the game data 30*b,* and the like.

A graphic processing unit 17, an audio synthesizing unit 20, a wireless communication control unit 23, and a network interface 26 are connected to the CPU 10 through the bus 11.

The graphic processing unit 17 draws a game image, including the virtual game space and the characters, in accordance with an instruction from the CPU 10. To be specific, the position, direction, zoom ratio (view angle), and the like of a virtual camera set in the virtual game space are adjusted, and the virtual camera takes an image of the virtual game space. The taken image is subjected to rendering processing, and thus, a two-dimensional game image to be displayed is generated. Further, an external display (display unit) 19 is connected to the graphic processing unit 17 through a video converting unit 18. The game image drawn by the graphic processing unit 17 is converted into a moving image format by the video converting unit 18 to be displayed on the display 19.

The audio synthesizing unit 20 reproduces and synthesizes digital-format sound data in accordance with an instruction from the CPU 10, the digital-format sound data being contained in the game data 30*b*. Further, an external speaker 22 is connected to the audio synthesizing unit 20 through an audio converting unit 21. Therefore, the sound data reproduced and synthesized by the audio synthesizing unit 20 is decoded into an analog format by the audio converting unit 21 to be output through the speaker 22 to an outside. As a result, the user who is playing the game can listen to the reproduced sound.

The wireless communication control unit 23 includes a 2.4 GHz band wireless communication module. The wireless communication control unit 23 is wirelessly connected to a controller 24 attached to the game device 2 and can transmit data to and receive data from the controller 24. The user can operate an operating portion 25 (see FIG. 2), such as a button, provided at the controller 24 to input a signal to the game device 2. Thus, the user controls the actions of the player character displayed on the display 19.

Figure 2:
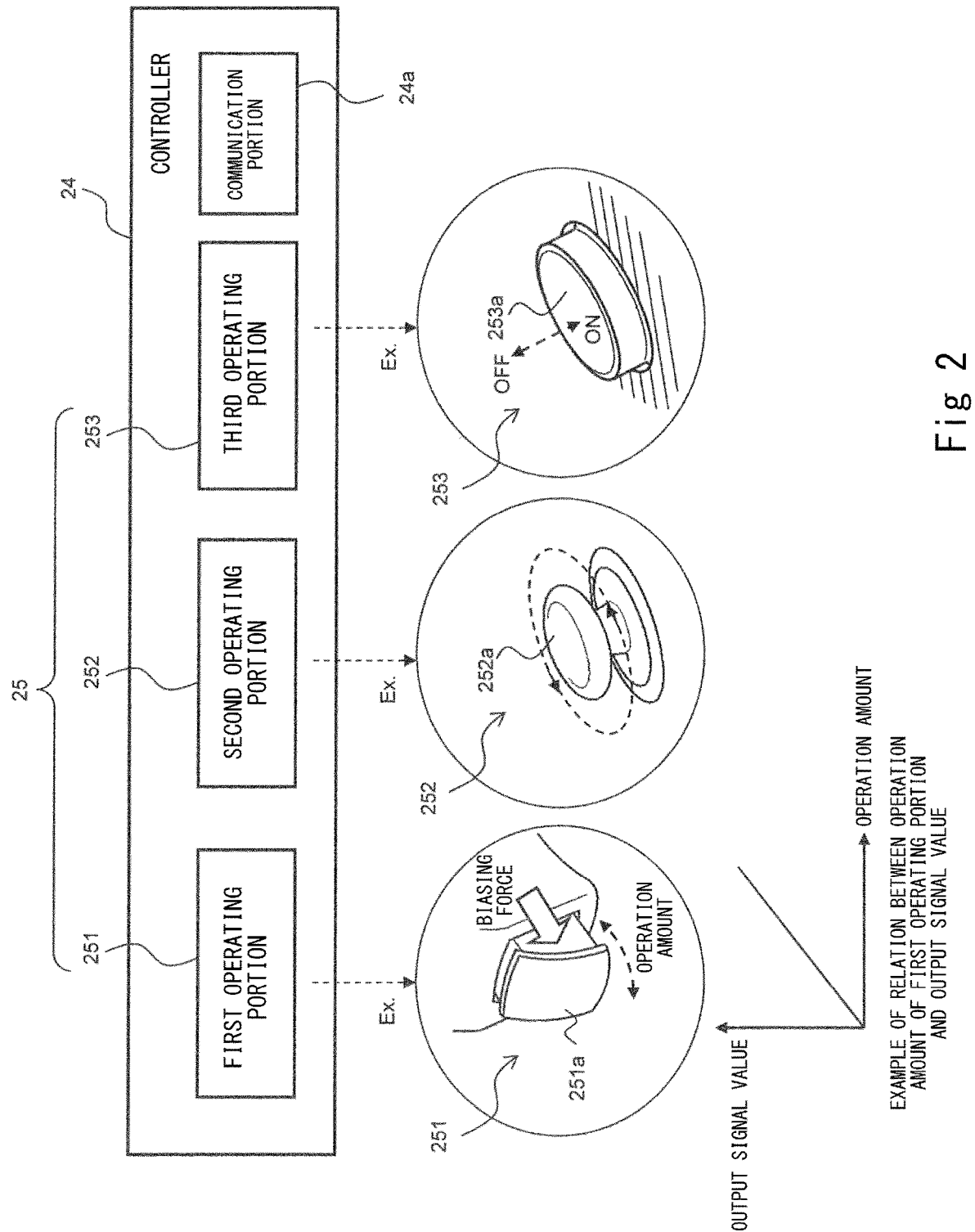
FIG. 2 is a diagram for explaining a configuration of a controller.

FIG. 2 is a diagram for explaining a configuration of the controller 24. The controller 24 includes: a communication unit 24*a* configured to communicate with the wireless communication control unit 23; and a plurality of operating portions 25 (251 to 253). More specifically, the operating portions 25 include a volume switch type first operating portion 251, a stick type second operating portion 252, and an on/off type third operating portion 253.

The volume switch type first operating portion 251 is configured to be physically and continuously displaced by an operation of the user. A relation between an operation amount by the user (i.e., a physical displacement amount of the first operating portion 251) and its output signal value (such as a voltage value or a frequency) is a one-to-one relation. Typically, as shown by a graph in FIG. 2, the relation between the operation amount of the first operating portion 251 and the output signal value is a proportional relation. To be specific, the output signal value reversibly increases or decreases in accordance with an increase or decrease in the operation amount of the first operating portion 251 such that, for example, the output signal value continuously increases as the operation amount continuously increases, and the output signal value continuously decreases as the operation amount continuously decreases. Therefore, based on the output signal from the first operating portion 251, the CPU 10 can uniquely acquire the operation amount of the first operating portion 251 operated by the user. In the game system 1 according to the present embodiment, the zoom ratio of the virtual camera and the method of reproducing the sound data continuously change in accordance with the continuous change in the displacement amount of the first operating portion 251 (details will be described later).

As shown in FIG. 2, an operator 251*a* biased in a projecting direction by an elastic body or the like can be adopted as a specific configuration example of the first operating portion 251. According to such configuration, when the operator 251*a* in a projecting state (i.e., at a non-operated position) is operated so as to be pressed with, for example, a forefinger, the operator 251*a* can be pressed to a predetermined position (maximally operated position). Further, when pressing pressure of the forefinger is eased, the operator 251*a* returns to an initial state by biasing force. At an arbitrary position (displacement amount; x%) between the non-operated position (displacement amount; 0%) and the maximally operated position (displacement amount; 100%), the first operating portion 251 outputs the output signal value corresponding to the displacement amount (operation amount) of the operator 251*a* from the non-operated position.

The stick type second operating portion 252 includes a stick-shaped operator 252*a* operated by, for example, a thumb of the user. The operator 252*a* can be tilted in any direction, i.e., can be tilted 360 degrees around a reference position of the operator 252*a* in an upright state. When the second operating portion 252 is operated, for example, the player character moves, an aiming mark for shooting displayed in the virtual game space moves, or the direction of the virtual camera that takes the image of the virtual game space changes in accordance with a tilting direction of the second operating portion 252.

The on/off type third operating portion 253 includes a button-shaped operator 253*a* operated by, for example, the thumb of the user. The third operating portion 253 outputs an on signal when operated by the user and outputs an off signal (or does not output the on signal) when not operated. The third operating portion 253 is used when, for example, determining various setting items on a configuration screen and executing (determining) a predetermined action of the player character, such as shooting toward aim.

It should be noted that the number of operating portions 251 (252, 253) is not limited to one and may be plural. The configurations of the operating portions 251 to 253 are just examples. Specific configurations of the operating portions 251 to 253 are not limited to these, and the other configurations can be adopted suitably.

Referring back to FIG. 1, the network interface 26 connects the game device 2 to the communication network NW such as the Internet or a LAN and is communicable with other game devices 2 and the server device 3. Then, the game device 2 is connected to other game devices 2 through the communication network NW, and transmission and reception of data are performed among these game devices 2. With this, a plurality of player characters can be displayed in the same game space in sync with one another. Therefore, multiplay in which a plurality of users cooperate to advance the game can be realized.

Functional Configuration of Game Device

Figure 3:
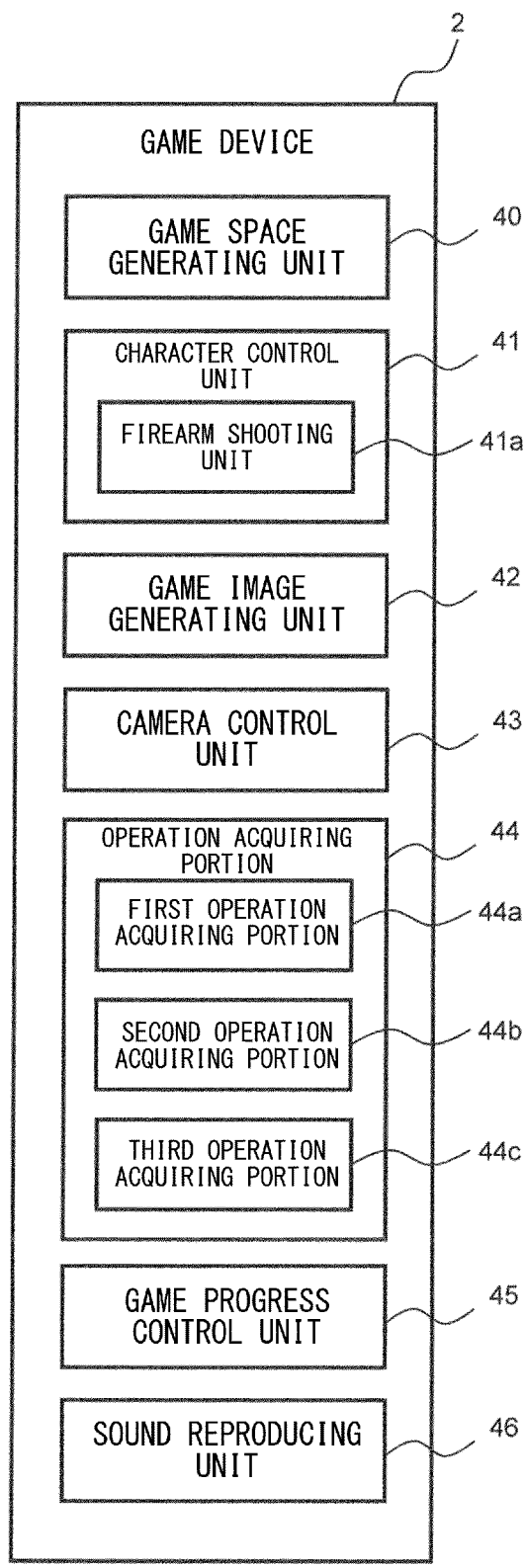
FIG. 3 is a block diagram showing a functional configuration of a game device.

FIG. 3 is a block diagram showing a functional configuration of the game device 2 included in the game system 1. The game device 2 executes the game program of the present invention to function as a game space generating unit 40, a character control unit 41, a game image generating unit 42, a camera control unit 43, an operation acquiring unit 44, a game progress control unit 45, and a sound reproducing unit 46. It should be noted that in terms of hardware, these functions are constituted by the CPU 10, the HDD 14, the ROM 15, the RAM 16, the graphic processing unit 17, the video converting unit 18, the audio synthesizing unit 20, the audio converting unit 21, the wireless communication control unit 23, and the like shown in FIG. 1.

The game space generating unit 40 generates a three-dimensional virtual game space that is a stage where the player character acts. The game space generating unit 40 generates the virtual game space by, for example, determining positions and textures of objects, setting of a light source, and settings of effects, such as fog and sparks of fire, for every frame in accordance with a frame rate.

The character control unit 41 generates in the virtual game space the player character whose actions are operated by the user and non-player characters which cannot be operated by the user. Further, in accordance with the operations of the operating portion 25 by the user, the character control unit 41 controls the actions of the player character and also controls the actions of the non-player characters depending on the situation of the game. For example, when the user tilts the second operating portion 252 in a certain direction, the character control unit 41 changes the posture of the player character to the certain direction or moves the player character in the certain direction. When the user presses the third operating portion 253, the character control unit 41 causes the player character to execute a predetermined attacking action.

As one example of the attacking action, the player character can use a firearm to shoot a distant enemy character. To realize such attack by the firearm, the character control unit 41 includes a firearm shooting unit 41a. To be specific, when the user presses the third operating portion 253, the firearm shooting unit 41a shoots a bullet (shot body) in a direction in which the virtual camera is directed in the virtual game space. Further, in accordance with the operation amount (displacement amount) of the first operating portion 251 when the third operating portion 253 is pressed, the firearm shooting unit 41a may change a shot grouping indicating a degree of dispersion of arrival positions of shot bodies.

Based on the image taken by the virtual camera, the game image generating unit 42 generates the game image at a predetermined frame rate, the game image being displayed on the display 19. For example, based on the virtual game space generated by the game space generating unit 40, the game image generating unit 42 performs rendering processing to obtain the two-dimensional game image taken by the virtual camera. In this rendering processing, publicly known image processing such as solid processing, removal processing, transparency processing, effect processing, and screen processing is suitably performed according to need.

The camera control unit 43 controls the virtual camera configured to take the image of the virtual game space. For example, when the user operates the first operating portion 251, the camera control unit 43 changes the zoom ratio (view angle) of the virtual camera in accordance with the operation amount (physical displacement amount) of the first operating portion 251. Further, when the user tilts the second operating portion 252 in a certain direction, the camera control unit 43 changes the direction of the virtual camera to the certain direction.

The operation acquiring unit 44 includes a first operation acquiring unit 44a, a second operation acquiring unit 44b, and a third operation acquiring unit 44c. The operation acquiring unit 44 acquires the presence or absence of the operation of each operating portion 25 operated by the user and the operation amount. To be specific, the first operation acquiring unit 44a acquires the operation amount (physical displacement amount) of the volume switch type first operating portion 251 operated by the user. The second operation acquiring unit 44b acquires the presence or absence of a tilting operation of the stick type second operating portion 252 operated by the user and the tilting direction. The third operation acquiring unit 44c acquires the presence or absence of a pressing operation of the on/off type third operating portion 253 operated by the user.

The game progress control unit 45 controls the progress of the game in accordance with the operation of the user, the elapse of an in-game time, and the like. For example, when the player character performs a predetermined action by the operation of the user, the game progress control unit 45 generates a predetermined event and reproduces a predetermined prerendering movie for a certain period of time. Further, as the in-game time elapses, the game progress control unit 45 changes environments in the virtual game space. Furthermore, in accordance with the location of the player character, and the like, the game progress control unit 45 causes enemy characters to appear at respective locations in the virtual game space.

The sound reproducing unit 46 reproduces the sound data in accordance with the situation of the game. The sound data contains at least background sound and effect sound. The background sound contains BGM reproduced during the game. As the BGM, the game data 30b contains different musics corresponding to various situations such as the type, season, and time of a field where the player character is located, the type of a mission in progress, and the type of the event generated. The effect sound contains: environmental sound (sound of wind and rain, sound of a wall clock, etc.) generated around the character; and sound (sound of footsteps, sound of opening and closing of a door, sound of shooting, sound of voice, etc.) generated by the action of the character.

When the first operating portion 251 is operated by the user, the sound reproducing unit 46 continuously changes the method of reproducing the sound data together with a change in the zoom ratio of the virtual camera by the camera control unit 43. For example, as the displacement amount of the first operating portion 251 increases, the camera control unit 43 increases the zoom ratio of the virtual camera, and the sound reproducing unit 46 lowers the pitch of the reproduced sound of the sound data. Typically, the sound reproducing unit 46 lowers the pitch of the background sound and may also lower the pitch of the effect sound generated in the vicinity of the player character (or in the vicinity of the virtual camera). As the displacement amount of the first operating portion 251 is reduced in a state where the first operating portion 251 is being operated, the camera control unit 43 reduces the zoom ratio of the virtual camera, and the sound reproducing unit 46 gradually restores the pitch of the reproduced sound of the sound data from the lowered pitch to an original pitch.

It should be noted that when lowering the pitch of the reproduced sound, amplitude of a signal waveform in a predetermined high-pitched sound range contained in the sound data is only required to be attenuated by using a low pass filter or the like. At this time, a degree of the lowering of the pitch of the sound may be increased by increasing an attenuation rate as the zoom ratio increases or by expanding an attenuated sound range from a high-pitched sound side to a low-pitched sound side as the zoom ratio increases. Or, the degree of the lowering of the pitch of the sound may be increased by simultaneously performing both of these. Further, the zoom ratio of the virtual camera and the lowering of the pitch of the reproduced sound reversibly change in accordance with the displacement of the first operating portion 251. To be specific, in contrast to the above case, when the displacement amount of the first operating portion 251 is reduced, the zoom ratio of the virtual camera is reduced, and the lowering of the pitch of the reproduced sound is eased.

Further, when the first operating portion 251 is operated by the user, the sound reproducing unit 46 changes, together with the change in the zoom ratio of the virtual camera by the camera control unit 43, reproduction sound volume of the sound data (typically, the effect sound) generated in the vicinity of an imaging target region taken by the virtual camera in the virtual game space. To be specific, the reproduction volume of the effect sound generated in the vicinity of the imaging target region is increased as the zoom ratio increases, and the reproduction volume of the effect sound is decreased as the zoom ratio decreases. It should be noted that in accordance with the change in the zoom ratio, both the lowering of the pitch of the background sound and the increase in the volume of the effect sound may be performed, or only one of those may be performed.

Further, regardless of the above, when a predetermined condition is satisfied, the sound reproducing unit 46 does not execute the change of the method of reproducing the sound data, the change of the method being performed in accordance with the change in the zoom ratio of the virtual camera. To be specific, the sound reproducing unit 46 starts reproducing predetermined sound data with the generation of a predetermined event (for example, an event related to an action, such as the attack, of the player character) in the virtual game space as a trigger. It should be noted that until a predetermined time elapses since the start of the reproduction of the predetermined sound data, the lowering of the pitch of the reproduced sound is not performed regardless of the operation amount of the first operating portion 251. Therefore, the sound data reproduced when the predetermined event is generated is reproduced as original sound at the start of the reproduction without the lowering of the pitch of the sound. After the predetermined time elapses, the pitch of the reproduced sound of the sound data is lowered in accordance with the operation amount of the first operating portion 251.

Operations of Game System

Next, operation examples of the game system in accordance with the operations of the controller 24 operated by the user will be explained.

OPERATION EXAMPLE 1

Figure 4:
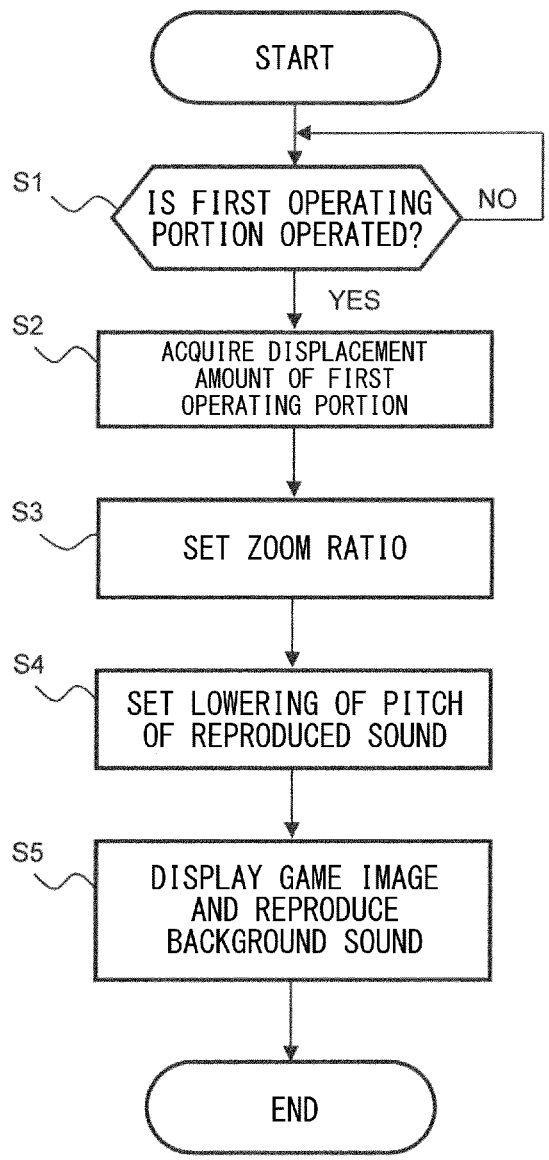
FIG. 4 is a flow chart for explaining Operation Example 1.

FIG. 4 is a flow chart showing control contents according to Operation Example 1 of the game system 1. Operation Example 1 will explain a case where the zoom ratio of the virtual camera and the lowering of the pitch of the reproduced sound of the sound data are continuously changed in accordance with the displacement amount of the first operating portion 251. In Operation Example 1, the background sound is used as the sound data.

As shown in FIG. 4, the game system 1 determines whether or not the first operating portion 251 is operated by the user (Step S1). When it is determined that the first operating portion 251 is operated by the user (YES in Step S1), the game system 1 acquires the displacement amount of the first operating portion 251 (Step S2). Next, in accordance with the displacement amount of the first operating portion 251, the game system 1 sets the zoom ratio of the virtual camera (Step S3) and further sets the lowering of the pitch of the reproduced sound of the background sound (Step S4). The order of execution of Steps S3 and S4 is not limited to this. The order of execution of Steps S3 and S4 may be reversed, or Steps S3 and S4 may be simultaneously executed. The game system 1 displays on the display 19 the game image generated by photographing the virtual game space at the set zoom ratio and reproduces the background sound whose pitch has been lowered in accordance with the setting (Step S5).

More specifically, in the game, a range where the first operating portion 251 is physically and continuously displaced and a range where the zoom ratio of the virtual camera continuously changes are associated with each other. Then, a specific zoom ratio is assigned to an arbitrary displacement amount of the first operating portion 251. Specifically, the zoom ratio of the virtual camera is set to increase as the displacement amount of the first operating portion 251 increases.

In addition to the above, in the game, the range where the first operating portion 251 is physically and continuously displaced and a range where the attenuation rate with respect to the high-pitched sound range of the reproduced sound of the background sound changes are associated with each other. Then, a specific attenuation rate is assigned to an arbitrary displacement amount of the first operating portion 251. Specifically, the attenuation rate is set to increase as the displacement amount of the first operating portion 251 increases. Setting information indicating a relation among the displacement amount of the first operating portion 251, the zoom ratio of the virtual camera, and the attenuation rate of the background sound (sound data) is contained in the game data 30b in advance.

Figure 5:
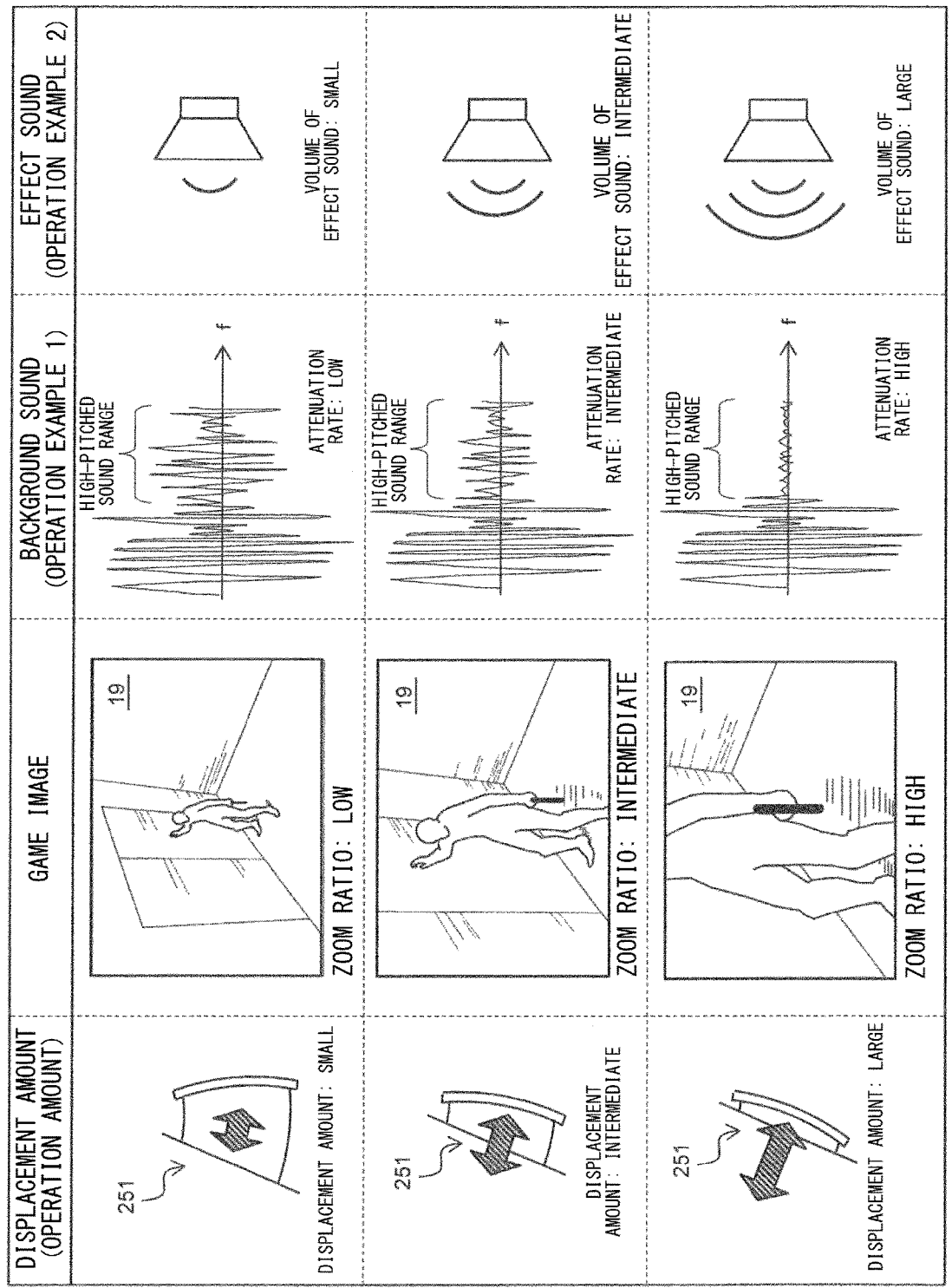
FIG. 5 is a schematic diagram for explaining Operation Examples 1 and 2.

According to the above settings, when the user operates the first operating portion 251 as shown in FIG. 5, the game image taken at the zoom ratio corresponding to the operation amount (displacement amount) of the first operating portion 251 is displayed on the display 19, and the background sound whose pitch has been lowered at the attenuation rate corresponding to the operation amount of the first operating portion 251 is reproduced. To be specific, when the operation amount is small, the image taken at the low zoom ratio is displayed, and the background sound, such as BGM, whose high-pitched sound range has not been significantly cut (attenuated) (in other words, whose high-pitched sound range is cut a little) is reproduced. In contrast, as the operation amount increases, the enlarged image taken at the higher zoom ratio is displayed, and the background sound, such as BGM, whose high-pitched sound range has been significantly cut, i.e., whose pitch has been lowered, is reproduced.

With this, the user can arbitrarily change the zoom ratio of the virtual camera in accordance with the operation of the first operating portion 251, and accordingly, the lowering of the pitch of the background sound such as BGM (i.e., a change in frequency characteristic) is realized. Therefore, presentation that promotes a change in concentration of the user as the zoom ratio changes can be performed.

Operation Example 1 has explained an example in which the lowering of the pitch of the reproduced sound of the sound data is realized by changing the attenuation rate of the high-pitched sound range. However, as described above, this may be realized by changing the attenuated sound range or by performing both of these. Further, the sound volume of the low-pitched sound range may be increased as the high-pitched sound range is attenuated. Further, a target whose pitch is lowered is not limited to the background sound and may be the other sound data.

OPERATION EXAMPLE 2

Figure 6:
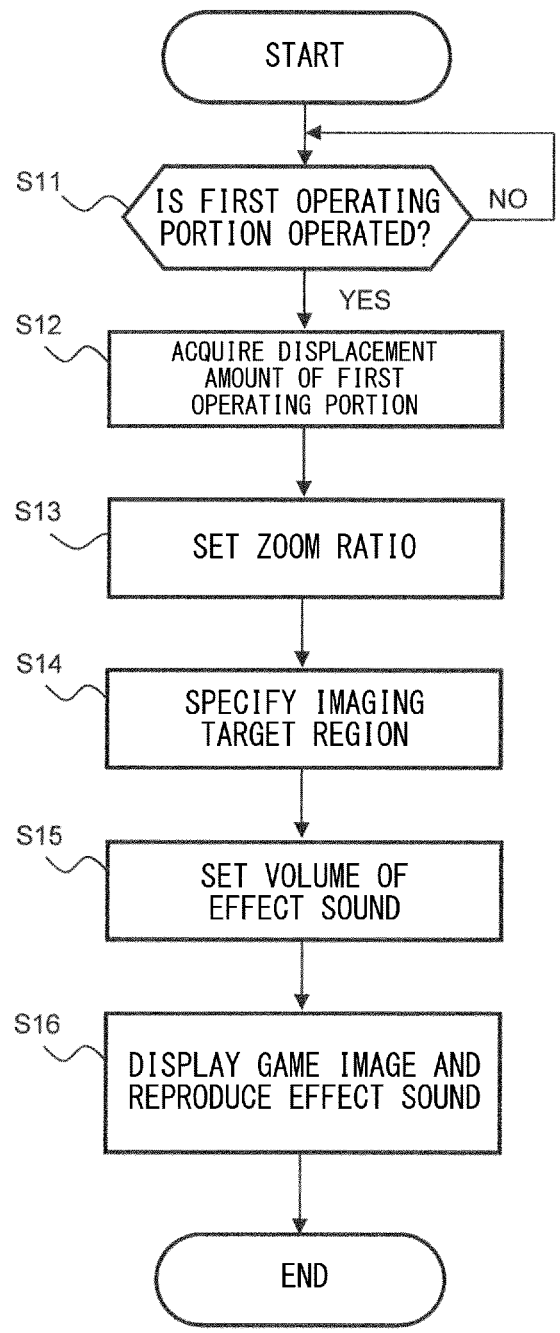
FIG. 6 is a flow chart for explaining Operation Example 2.

FIG. 6 is a flow chart showing the control contents according to Operation Example 2 of the game system 1. Operation Example 2 will explain a case where the zoom ratio of the virtual camera and the volume of the reproduced sound of the sound data generated in the vicinity of the imaging target region taken by the virtual camera are changed in accordance with the displacement amount of the first operating portion 251. In Operation Example 2, the effect sound is used as the sound data.

In Operation Example 2, as with Operation Example 1, the range where the first operating portion 251 is physically and continuously displaced and the range where the zoom ratio of the virtual camera continuously changes are associated with each other. To be specific, a specific zoom ratio is assigned to an arbitrary displacement amount of the first operating portion 251, and the zoom ratio of the virtual camera is set to increase as the displacement amount of the first operating portion 251 increases.

In addition to the above, in Operation Example 2, the range where the first operating portion 251 is physically and continuously displaced and the reproduction volume of the effect sound generated in the vicinity of the imaging target region taken by the virtual camera are associated with each other. To be specific, a specific reproduction volume of the effect sound is assigned to an arbitrary displacement amount of the first operating portion 251. Specifically, the reproduction volume of the effect sound is set to increase as the displacement amount of the first operating portion 251 increases. Setting information indicating a relation among the displacement amount of the first operating portion 251, the zoom ratio of the virtual camera, and the reproduction volume of the effect sound (sound data) is contained in the game data 30b in advance.

According to the above settings, the game system 1 operates as below. As shown in FIG. 6, the game system 1 determines whether or not the first operating portion 251 is operated by the user (Step S11). When it is determined that the first operating portion 251 is operated by the user (YES in Step S11), the game system 1 acquires the displacement amount of the first operating portion 251 (Step S12). Next, the game system 1 sets the zoom ratio of the virtual camera in accordance with the displacement amount of the first operating portion 251 (Step S13).

Next, the game system 1 specifies the imaging target region taken when the virtual game space is taken by the virtual camera at the set zoom ratio (Step S14). Then, the volume of the effect sound (sound data) generated in the vicinity of the imaging target region is set to a value corresponding to the displacement amount of the first operating portion 251, the displacement amount being acquired in Step S12 (Step S15). After that, the game system 1 displays on the display 19 the game image generated by photographing the virtual game space at the set zoom ratio and reproduces the effect sound in the vicinity of the imaging target region at the set volume (Step S16).

To be specific, as the zoom ratio increases in accordance with the operation of the first operating portion 251 operated by the user, the reproduction volume of the effect sound generated in the vicinity of the imaging target region increases. Further, as the zoom ratio decreases in accordance with the operation of the first operating portion 251 operated by the user, the reproduction volume of the effect sound decreases.

For example, as shown in FIG. 5, when the virtual camera is directed to the enemy character located far away from the player character, the user operates the first operating portion 251 to continuously increase the zoom ratio of the virtual camera. In this case, as the zoom ratio increases, the sound reproducing unit 46 increases the reproduction volume of the effect sound (sound of footsteps, sound of breathing, etc.) generated in the vicinity of the enemy character taken by the virtual camera.

With this, the user can arbitrarily change the zoom ratio of the virtual camera in accordance with the operation of the first operating portion 251, and accordingly, can more clearly listen to the sound generated in the vicinity of a visually recognized target. Therefore, presentation of realistic sensation which makes the user feel that the user himself/herself approaches to the visually recognized target is performed as the zoom ratio increases. Thus, an effect of increasing the concentration of the user can be expected. It should be noted that a target whose reproduction volume is changed is not limited to the effect sound and may be the other sound data.

OPERATION EXAMPLE 3

Figure 7:
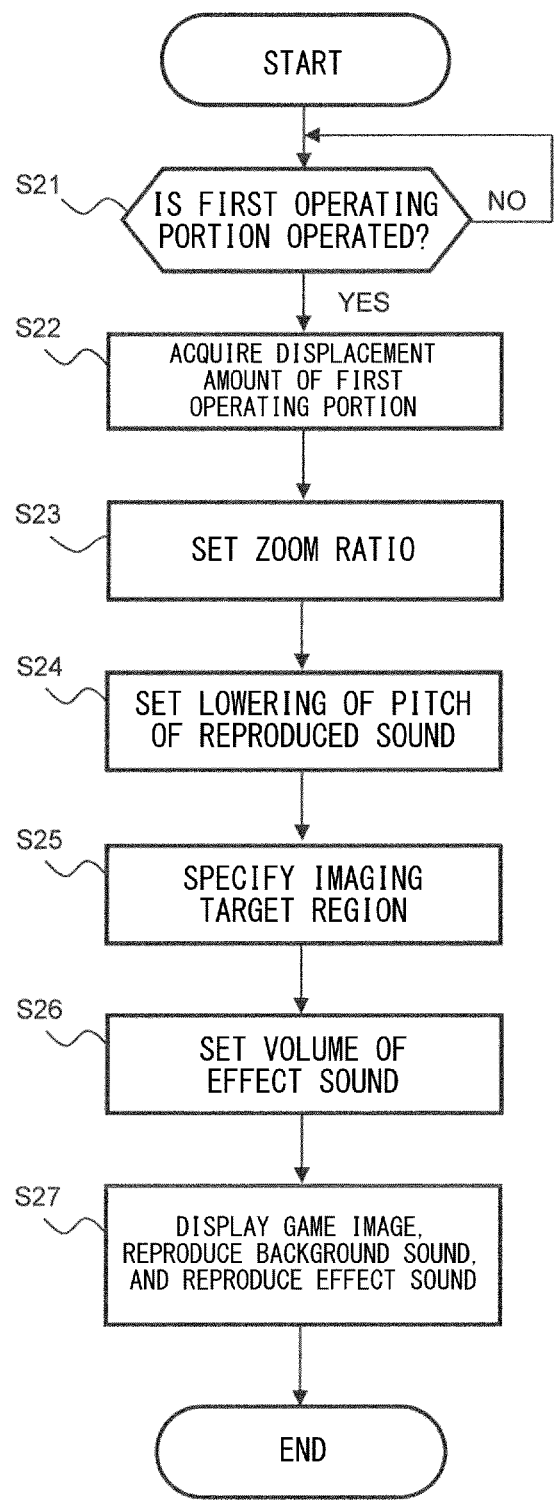
FIG. 7 is a flow chart for explaining Operation Example 3.

As described below, the game system 1 can execute Operation Examples 1 and 2 in parallel. FIG. 7 is a flow chart showing the control contents according to Operation Example 3 of the game system 1.

As shown in FIG. 7, the game system 1 determines whether or not the first operating portion 251 is operated by the user (Step S21). When it is determined that the first operating portion 251 is operated by the user (YES in Step S21), the game system 1 acquires the displacement amount of the first operating portion 251 (Step S22). Next, in accordance with the displacement amount of the first operating portion 251, the game system 1 sets the zoom ratio of the virtual camera (Step S23) and sets the lowering of the pitch of the reproduced sound of the background sound (sound data) (Step S24).

Next, the game system 1 specifies the imaging target region taken when the virtual game space is taken by the virtual camera at the set zoom ratio (Step S25). Then, the volume of the effect sound (sound data) generated in the vicinity of the imaging target region is set to a value corresponding to the displacement amount of the first operating portion 251, the displacement amount being acquired in Step S22 (Step S26). After that, the game system 1 executes the displaying of the game image, the reproduction of the background sound, and the reproduction of the effect sound based on the respective settings (Step S27). To be specific, the game system 1 displays on the display 19 the game image generated by photographing the virtual game space at the set zoom ratio, reproduces the background sound whose pitch has been lowered based on the setting, and further reproduces the effect sound in the vicinity of the imaging target region at the set volume.

With this, the user can arbitrarily change the zoom ratio of the virtual camera in accordance with the operation of the first operating portion 251, and accordingly, can execute the lowering of the pitch of the game sound such as BGM and the increase in the volume of the effect sound generated in the vicinity of the visually recognized target. As a result, the presentation that promotes the change in the concentration of the user and increases the realistic sensation in accordance with the change in the zoom ratio can be realized.

OPERATION EXAMPLE 4

Figure 8:
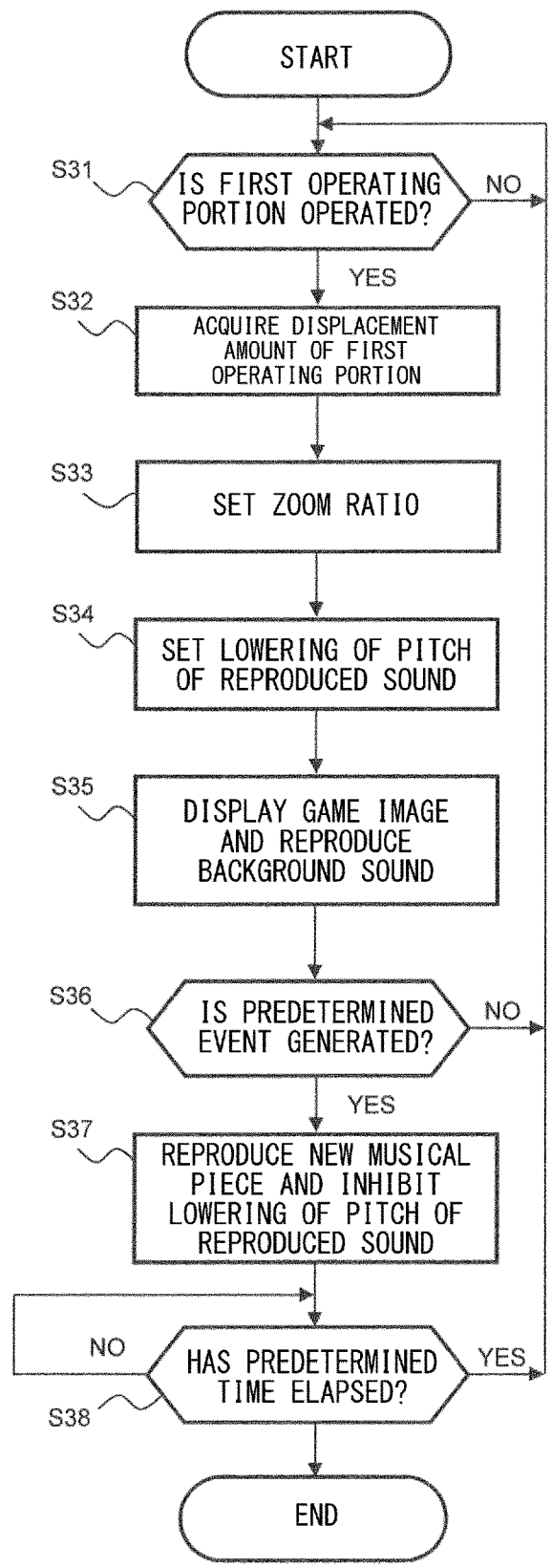
FIG. 8 is a flow chart for explaining Operation Example 4.

FIG. 8 is a flow chart showing the control contents according to Operation Example 4 of the game system 1. In the game, the pitch of the reproduced sound of the sound data which is started to be reproduced in a predetermined case can be prevented only in a predetermined time from being lowered regardless of the operation amount of the first operating portion 251. Operation Example 4 will explain such game system 1.

In the game, when the third operating portion 253 is operated in a state where the enemy character is enlarged and displayed by the operation of the first operating portion 251, an attack action such as shooting of a gun can be executed by the firearm shooting unit 41a. When the bullet hits the enemy character (when a predetermined event is generated), this may trigger the reproduction of a different musical piece (sound data) to perform presentation of the change in the situation of the game. In the game, in such a case, the lowering of the pitch of the sound is not executed at the time of the start of the reproduction of the musical piece.

As shown in FIG. 8, the game system 1 executes Steps S31 to S35 that are the same as Steps S1 to S5 of Operation Example 1. To be specific, the game system 1 determines whether or not the first operating portion 251 is operated by the user (Step S31). When it is determined that the first operating portion 251 is operated by the user (YES in Step S1), the game system 1 acquires the displacement amount of the first operating portion 251 (Step S32). Next, in accordance with the displacement amount of the first operating portion 251, the game system 1 sets the zoom ratio of the virtual camera (Step S33) and further sets the lowering of the pitch of the reproduced sound of the background sound (Step S34). Then, the game system 1 displays on the display 19 the game image generated by photographing the virtual game space at the set zoom ratio and reproduces the background sound whose pitch has been lowered in accordance with the setting (Step S35).

Steps S31 to S35 are repeatedly executed while the predetermined event is not being generated (NO in Step S36). An event related to a predetermined action of the player character can be set as the predetermined event. Typically, an event indicating success of the attack action is adoptable. When the attack action is the shooting, hitting of the bullet on the enemy character can be set as the predetermined event. The predetermined event is not limited to this and may be set as: hitting of an object, such as a thrown stone or a thrown ax, on the enemy character or a predetermined target; an exercise of a predetermined skill; achievement of the effect of magic; and the like.

The game system 1 determines whether or not the predetermined event has been generated (Step S36). When it is determined that the predetermined event has been generated (YES in Step S36), the game system 1 starts reproducing a new musical piece (predetermined sound data) different from the previous musical piece and inhibits the lowering of the pitch of the reproduced sound (Step S37). With this, the new musical piece whose pitch has not been lowered is reproduced regardless of the operation amount of the first operating portion 251.

Then, the game system 1 determines whether or not a predetermined time has elapsed since the start of the reproduction of the new musical piece (Step S38). The predetermined time may be set arbitrarily and may be, for example, 5 to 10 seconds. The determination in Step S38 is repeatedly performed until the predetermined time elapses. When it is determined that the predetermined time has elapsed (YES in Step S38), Step S31 and the subsequent steps are executed again. With this, in accordance with the displacement amount of the first operating portion 251 at this time, the pitch of the reproduced sound of the musical piece is lowered.

Thus, even when the image taken by the virtual camera is in a zoomed state, the predetermined musical piece which is started to be reproduced together with the generation of the predetermined event can be reproduced without lowering the pitch of an introduction part of the predetermined musical piece. Therefore, more effective presentation of the generation of the event can be performed.

OPERATION EXAMPLE 5

Operation Example 4 has explained a case of inhibiting the lowering of the pitch of the musical piece which is started to be reproduced at the time of the generation of the predetermined event. Instead of or in addition to the inhibition of the lowering of the pitch of the sound, the setting of changing the volume of the effect sound as explained in Operation Example 2 may be inhibited.

When inhibiting the setting of changing the volume instead of the inhibition of the lowering of the pitch of the sound, Steps S11 to S16 of FIG. 6 and then Steps S36 to S38 of FIG. 8 are only required to be executed. At this time, in Step S37, the reproduction of the new musical piece and the inhibition of the change in the volume of the effect sound are only required to be executed.

When inhibiting the setting of changing the volume in addition to the inhibition of the lowering of the pitch of the sound, Steps S21 to S27 of FIG. 7 and then Steps S36 to S38 of FIG. 8 are only required to be executed. At this time, in Step S37, the reproduction of the new musical piece, the inhibition of the lowering of the pitch of the reproduced sound, and the inhibition of the change in the volume of the effect sound are only required to be executed.

With this, even when the zoom ratio of the virtual camera is high, the volume of the effect sound of the background does not increase at the time of the generation of the event. Thus, the user can easily listen to the introduction part of the reproduced musical piece. To be specific, further effective presentation of the generation of the event can be performed.

The foregoing has explained the volume switch type first operating portion 251 as the "first operating portion" according to the present invention. However, the "first operating portion" according to the present invention is not limited to this. For example, known is a system, such as KINECT (trademark), which advances a game based on actions of a user detected by a camera and the like. In such system, the user himself/herself who acts is the "first operating portion," and a unit configured to detect the actions of the user corresponds to a "first operation acquiring unit" according to the present invention.

INDUSTRIAL APPLICABILITY

The present invention is applicable to a game system of a game using a three-dimensional virtual game space as a stage, a method of controlling the game system, and a nonvolatile recording medium.

REFERENCE SIGNS LIST 1 game system
2 game device
10 CPU (computer)
24 controller
25 operating portion
251 first operating portion
252 second operating portion
253 third operating portion
30 disc-shaped recording medium (nonvolatile recording medium)
30a game program
30b game data
40 game space generating unit
41 character control unit
42 game image generating unit
43 camera control unit
44 operation acquiring unit
45 game progress control unit
46 sound reproducing unit

The invention claimed is:

1. A game system comprising:
a virtual camera control unit configured to control a virtual camera configured to take an image of a three-dimensional virtual game space;
a game image generating unit configured to generate a game image based on the taken image;
a sound reproducing unit configured to reproduce sound data in accordance with a situation of a game; and
a first operation acquiring unit configured to acquire a physical and continuous displacement amount of a first operating portion operated by a user, wherein
in accordance with a continuous change in the displacement amount of the first operating portion, the virtual camera control unit continuously changes a zoom ratio of the virtual camera, and the sound reproducing unit continuously changes a method of reproducing the sound data.

2. The game system according to claim 1, wherein as the displacement amount of the first operating portion increases, the virtual camera control unit increases the zoom ratio of the virtual camera, and the sound reproducing unit lowers a pitch of reproduced sound of the sound data.

3. The game system according to claim 2, wherein the sound reproducing unit attenuates a waveform of a predetermined high-pitched sound range contained in the sound data to lower the pitch of the reproduced sound of the sound data.

4. The game system according to claim 1, wherein as the displacement amount of the first operating portion increases, the virtual camera control unit increases the zoom ratio of the virtual camera, and the sound reproducing unit increases a volume of reproduced sound of the sound data generated at a region taken by the virtual camera in the virtual game space.

5. The game system according to claim 1, wherein:
the sound reproducing unit starts reproducing predetermined sound data with a generation of a predetermined event in the virtual game space as a trigger; and
until a predetermined time elapses since the start of the reproduction of the predetermined sound data, the sound reproducing unit inhibits a change of the method of reproducing the sound data regardless of the displacement amount of the first operating portion.

6. A method of controlling a game system,
the method comprising:
a virtual camera controlling step of controlling a virtual camera configured to take an image of a three-dimensional virtual game space;
a game image generating step of generating a game image based on the taken image;
a sound reproducing step of reproducing sound data in accordance with a situation of a game; and
a first operation acquiring step of acquiring a physical and continuous displacement amount of a first operating portion operated by a user, wherein
in accordance with a continuous change in the displacement amount of the first operating portion, the virtual camera controlling step continuously changes a zoom ratio of the virtual camera, and the sound reproducing step continuously changes a method of reproducing the sound data.

7. The method according to claim 6, wherein as the displacement amount of the first operating portion increases, the virtual camera controlling step increases the zoom ratio of the virtual camera, and the sound reproducing step lowers a pitch of reproduced sound of the sound data.

8. The method according to claim 7, wherein the sound reproducing step attenuates a waveform of a predetermined high-pitched sound range contained in the sound data to lower the pitch of the reproduced sound of the sound data.

9. The method according to claim 6, wherein as the displacement amount of the first operating portion increases, the virtual camera controlling step increases the zoom ratio of the virtual camera, and the sound reproducing step increases a volume of reproduced sound of the sound data generated at a region taken by the virtual camera in the virtual game space.

10. The method according to claim 6, wherein:
the sound reproducing step starts reproducing predetermined sound data with a generation of a predetermined event in the virtual game space as a trigger; and
until a predetermined time elapses since the start of the reproduction of the predetermined sound data, the sound reproducing step inhibits a change of the method of reproducing the sound data regardless of the displacement amount of the first operating portion.

11. A nonvolatile and non-transitory recording medium storing a command executable by a computer,
the nonvolatile recording medium being readable by the computer,
he command comprising:
a virtual camera controlling step of controlling a virtual camera configured to take an image of a three-dimensional virtual game space;

a game image generating step of generating a game image based on the taken image;

a sound reproducing step of reproducing sound data in accordance with a situation of a game; and a first operation acquiring step of acquiring a physical and continuous displacement amount of a first operating portion operated by a user, wherein in accordance with a continuous change in the displacement amount of the first operating portion, the virtual camera controlling step continuously changes a zoom ratio of the virtual camera, and the sound reproducing step continuously changes a method of reproducing the sound data.

12. The nonvolatile and non-transitory recording medium according to claim 11, wherein as the displacement amount of the first operating portion increases, the virtual camera controlling step increases the zoom ratio of the virtual camera, and the sound reproducing step lowers a pitch of reproduced sound of the sound data.

13. The nonvolatile and non-transitory recording medium according to claim 12, wherein the sound reproducing step attenuates a waveform of a predetermined high-pitched sound range contained in the sound data to lower the pitch of the reproduced sound of the sound data.

14. The nonvolatile and non-transitory recording medium according to claim 11, wherein as the displacement amount of the first operating portion increases, the virtual camera controlling step increases the zoom ratio of the virtual camera, and the sound reproducing step increases a volume of reproduced sound of the sound data generated at a region taken by the virtual camera in the virtual game space.

15. The nonvolatile and non-transitory recording medium according to claim 11, wherein:

the sound reproducing step starts reproducing predetermined sound data with a generation of a predetermined event in the virtual game space as a trigger; and until a predetermined time elapses since the start of the reproduction of the predetermined sound data, the sound reproducing step inhibits a change of the method of reproducing the sound data regardless of the displacement amount of the first operating portion.

\* \* \* \* \*